United States Patent
Rajagopalan et al.

(10) Patent No.: US 12,028,271 B2
(45) Date of Patent: Jul. 2, 2024

(54) PRIORITIZING MESSAGES FOR SERVER PROCESSING BASED ON MONITORING AND PREDICTING SERVER RESOURCE UTILIZATION

(71) Applicant: Bank of America Corporation, Charlotte, NC (US)

(72) Inventors: Lakshmi Narasimhan Rajagopalan, Chennai (IN); Rangarajan Lakshminarasimhan, Chennai (IN); Prabhu Sannasi Maharajan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/075,683

(22) Filed: Dec. 6, 2022

(65) Prior Publication Data

US 2024/0187355 A1    Jun. 6, 2024

(51) Int. Cl.
*H04L 47/70* (2022.01)
*H04L 47/74* (2022.01)
*H04L 47/762* (2022.01)

(52) U.S. Cl.
CPC .......... *H04L 47/821* (2013.01); *H04L 47/748* (2013.01); *H04L 47/762* (2013.01)

(58) Field of Classification Search
CPC .................................................. H04L 47/748
See application file for complete search history.

(56) References Cited

U.S. PATENT DOCUMENTS

| | | | |
|---|---|---|---|
| 5,828,995 A | 10/1998 | Satyamurti et al. | |
| 7,162,029 B2 | 1/2007 | Soman et al. | |
| 7,272,235 B2 | 9/2007 | Lu et al. | |
| 7,506,195 B2 | 3/2009 | Takahashi et al. | |
| 7,941,491 B2 | 5/2011 | Sood | |
| 8,463,789 B1 | 6/2013 | Joshi et al. | |
| 8,874,642 B2 | 10/2014 | Bhagat et al. | |
| 9,065,741 B1 * | 6/2015 | Varanasi | H04L 63/0485 |

(Continued)

FOREIGN PATENT DOCUMENTS

EP    2888858 A1    7/2015

*Primary Examiner* — Clayton R Williams
(74) *Attorney, Agent, or Firm* — Banner & Witcoff, Ltd.

(57) ABSTRACT

Aspects of the disclosure relate to prioritizing messages for server processing based on monitoring and predicting server resource utilization. A computing platform may monitor a plurality of servers (e.g., processing engines) to determine a current processing capacity and a maximum processing capacity of each processing engine. The computing platform may predict a quantity of application messages that may be received and/or processed by each processing engine at a later time. The computing platform may generate an application message prioritization framework comprising the prediction, the current processing capacity, and the maximum processing capacity of each processing engine. The computing platform may use the application message prioritization framework to prioritize received application messages to be processed, and to determine whether an application message should be stored in a backlog for processing at a later time or whether the application message should be transmitted to a processing engine for processing.

20 Claims, 7 Drawing Sheets

(56) References Cited

U.S. PATENT DOCUMENTS

| | | |
|---|---|---|
| 9,379,982 B1 * | 6/2016 | Krishna .............. H04L 67/1034 |
| 9,552,547 B2 | 1/2017 | Leeman-Munk et al. |
| 9,594,450 B2 | 3/2017 | Lynn et al. |
| 9,787,273 B2 | 10/2017 | Iyer |
| 9,807,016 B1 * | 10/2017 | Sarangapani ........... H04L 67/02 |
| 10,055,066 B2 | 8/2018 | Lynn et al. |
| 10,353,509 B2 | 7/2019 | Lynn et al. |
| 10,511,560 B2 | 12/2019 | Kursun et al. |
| 10,565,093 B1 | 2/2020 | Herrin et al. |
| 10,732,755 B2 | 8/2020 | Lynn et al. |
| 11,016,607 B2 | 5/2021 | Lynn et al. |
| 11,038,786 B2 | 6/2021 | Dinh et al. |
| 11,042,910 B2 | 6/2021 | Brigham |
| 11,164,125 B2 | 11/2021 | Pandey et al. |
| 11,206,673 B2 | 12/2021 | Nishiyama |
| 11,237,871 B1 | 2/2022 | Wires et al. |
| 11,315,549 B2 | 4/2022 | Parc et al. |
| 2004/0240918 A1 | 12/2004 | Soman et al. |
| 2012/0014540 A1 | 1/2012 | Lu et al. |
| 2014/0046881 A1 | 2/2014 | Losl et al. |
| 2017/0155610 A1 | 6/2017 | Hosie et al. |
| 2017/0371722 A1 | 12/2017 | Ahmed et al. |
| 2020/0233716 A1 | 7/2020 | Craig et al. |

* cited by examiner

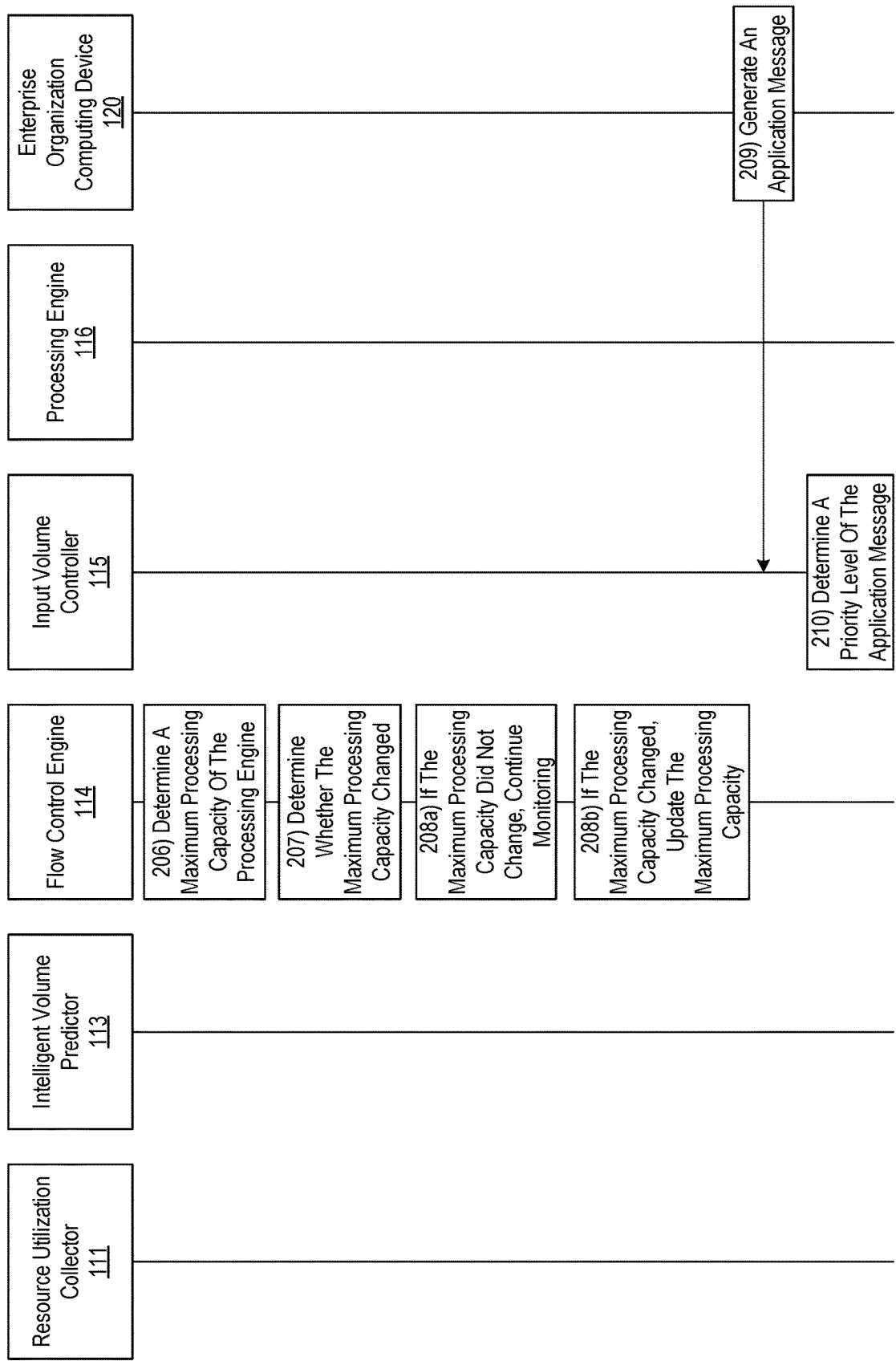

PRIORITIZING MESSAGES FOR SERVER PROCESSING BASED ON MONITORING AND PREDICTING SERVER RESOURCE UTILIZATION

BACKGROUND

Aspects of the disclosure relate to hardware and software for prioritizing messages for server processing based on monitoring and predicting server resource utilization. In particular, one or more aspects of the disclosure may relate to determining a maximum processing capacity of a plurality of processing engines, determining a priority level associated with a plurality of application messages to be processed, predicting a volume of application messages to be processed based on historical processing data, and prioritizing the processing of received application messages based on maximum processing capacities and the priority levels.

Current software systems utilize a plurality of servers (e.g., processing engines) that may receive messages (e.g., application messages) from an enterprise organization application and may process the application messages to provide industry-specific services to an enterprise organization. Over time, the plurality of processing engines may experience depleted processing resources and/or reduced processing capacity. In such instances, the enterprise organization may manually elect high priority application messages for processing (e.g., until the processing resources are replenished and/or until processing capacity is less than a pre-determined maximum). Additionally or alternatively, the enterprise organization may increase the number of processing engines within the plurality of processing engines to avoid overloading a single processing engine with the totality of the application messages. Moreover, the enterprise organization may partition an application message and distribute the portions to different processing engines to preserve the processing resources associated with each processing engine. However, the addition of processing engines and/or the partition of application messages may increase a total overhead cost associated with processing application messages. Therefore, current software systems might not permit the enterprise organization to continuously predict a volume of application messages to be processed, determine a maximum processing capacity of each processing engine, generate an application message prioritization framework based on the predictions and the maximum processing capacities, and process received application messages in accordance with the application message prioritization framework.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with prioritizing messages for server processing based on monitoring and predicting server resource utilization.

In accordance with one or more embodiments, a method may comprise monitoring, by a computing platform having at least one processor, memory and a communication interface, a plurality of processing engines. The method may comprise generating, by the at least one processor and based on the monitoring, data that indicates a quantity of application messages, of a plurality of application messages, processed by each processing engine of a plurality of processing engines. The method may comprise generating, by the at least one processor and based on the monitoring, data that describes processing details associated with each application message. The method may comprise predicting, by the at least one processor and using the data that describes the plurality of application messages processed by the plurality of processing engines, a maximum processing capacity for each processing engine of the plurality of processing engines. The method may comprise determining, by the at least one processor and using the data that describes processing details associated with each application message, a priority level that describes each application message of the plurality of application messages. The method may comprise generating, by the at least one processor, an application message prioritization framework based on the maximum processing capacities and the priority levels. The method may comprise receiving, by the at least one processor and from an enterprise organization application, an application message to be processed. The method may comprise determining, by the at least one processor and based on the application message prioritization framework, whether a processing engine of the plurality of processing engine has capacity to process the application message. The method may comprise, based on determining the processing engine has capacity to process the application message, determining, by the at least one processor and based on the application message prioritization framework, whether the application message is associated with a first priority level. The method may comprise, based on determining the application message is associated with the first priority level, transmitting, by the at least one processor, the application message to the processing engine to be processed.

In accordance with one or more embodiments, a computing platform may comprise at least one processor, a communication interface communicatively coupled to the at least one processor, and memory storing computer-readable instructions that, when executed by the at least one processor, cause the computing platform to monitor, by a computing platform, a plurality of processing engines. The computing platform may generate, based on the monitoring, data that indicates a quantity of application messages, of a plurality of application messages, processed by each processing engine of a plurality of processing engines. The computing platform may generate, based on the monitoring, data that describes processing details associated with each application message. The computing platform may predict, using the data that describes the plurality of application messages processed by the plurality of processing engines, a maximum processing capacity for each processing engine of the plurality of processing engines. The computing platform may determine, using the data that describes processing details associated with each application message, a priority level that describes each application message of the plurality of application messages. The computing platform may generate an application message prioritization framework based on the maximum processing capacities and the priority levels. The computing platform may receive, from an enterprise organization application, an application message to be processed. The computing platform may determine, based on the application message prioritization framework, whether a processing engine of the plurality of processing engine has capacity to process the application message. The computing platform may, based on determining the processing engine has capacity to process the application message, determine, based on the application message prioritization framework, whether the application message is associated with a first priority level. The computing platform may, based on determining the application message is associated with the first priority level, transmit the application message to the processing engine to be processed.

In accordance with one or more embodiments, one or more non-transitory computer-readable media storing instructions that, when executed by a computing platform comprising at least one processor, memory, and a communication interface, cause the computing platform to monitor, by a computing platform, a plurality of processing engines. The instructions, when executed, may cause the computing platform to generate, based on the monitoring, data that indicates a quantity of application messages, of a plurality of application messages, processed by each processing engine of a plurality of processing engines. The instructions, when executed, may cause the computing platform to generate, based on the monitoring, data that describes processing details associated with each application message. The instructions, when executed, may cause the computing platform to predict, using the data that describes the plurality of application messages processed by the plurality of processing engines, a maximum processing capacity for each processing engine of the plurality of processing engines. The instructions, when executed, may cause the computing platform to determine, using the data that describes processing details associated with each application message, a priority level that describes each application message of the plurality of application messages. The instructions, when executed, may cause the computing platform to generate an application message prioritization framework based on the maximum processing capacities and the priority levels. The instructions, when executed, may cause the computing platform to receive, from an enterprise organization application, an application message to be processed. The instructions, when executed, may cause the computing platform to determine, based on the application message prioritization framework, whether a processing engine of the plurality of processing engine has capacity to process the application message. The instructions, when executed, may cause the computing platform to, based on determining the processing engine has capacity to process the application message, determine, based on the application message prioritization framework, whether the application message is associated with a first priority level. The instructions, when executed, may cause the computing platform to, based on determining the application message is associated with the first priority level, transmit the application message to the processing engine to be processed.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIG. 2A-2D depict an illustrative event sequence for prioritizing messages for server processing based on monitoring and predicting server resource utilization, in accordance with one or more example embodiments.

DETAILED DESCRIPTION

Figure 1A:
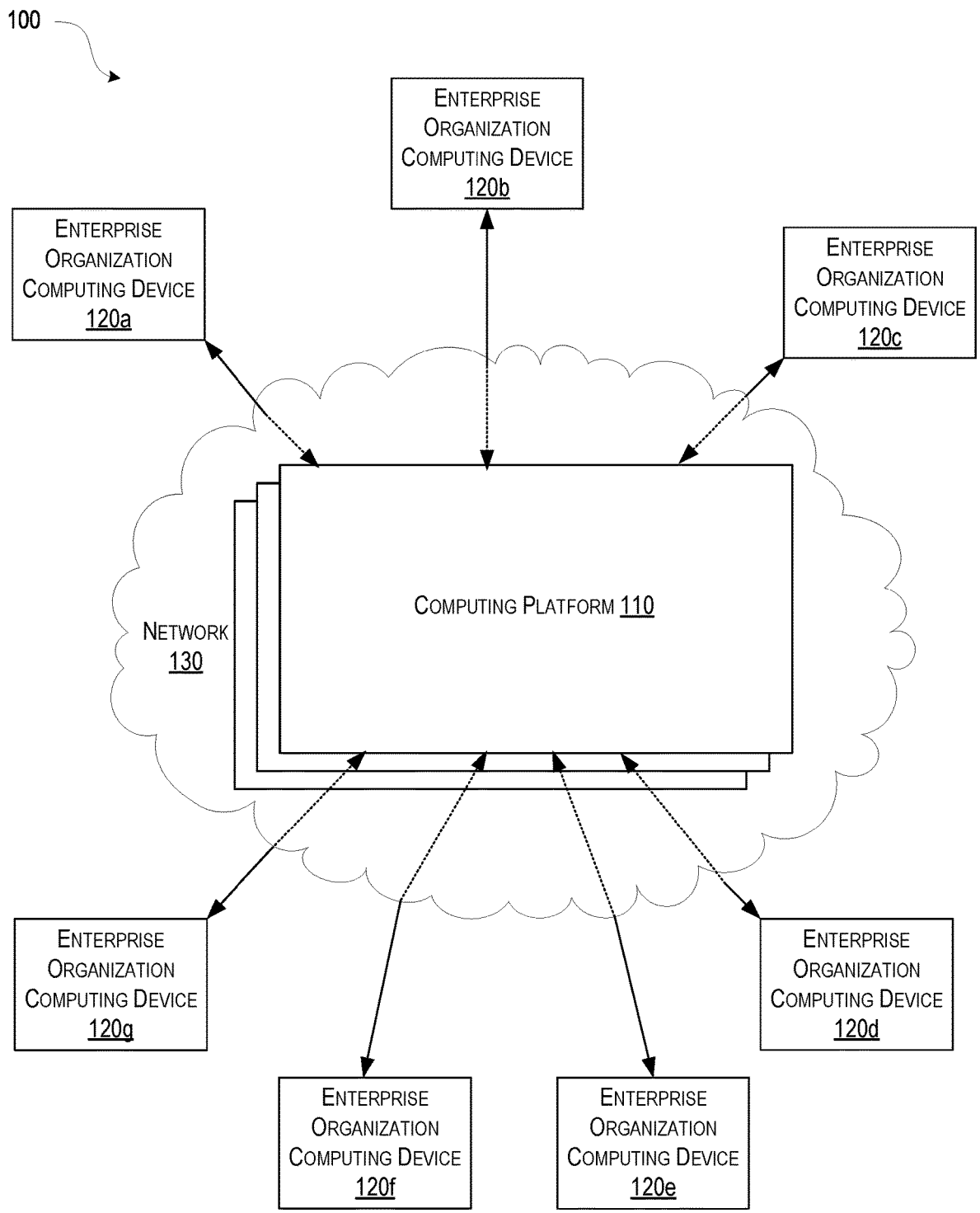
FIG. 1A depicts an illustrative example of a computer system for prioritizing messages for server processing based on monitoring and predicting server resource utilization, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current software systems might not permit the enterprise organization to continuously predict a volume of application messages to be processed, determine the maximum processing capacity of each processing engine, generate the application message prioritization framework based on the predictions and the maximum processing capacities, and process received application messages in accordance with the application message prioritization framework. Accordingly, proposed herein is a solution to the problem described above that includes prioritizing messages for server processing based on monitoring and predicting server resource utilization. For example, a computing platform may monitor a plurality of processing engines and may generate data that describes each processing engine. The computing platform may analyze the data to predict a volume of application messages that may be received in the future and to determine a maximum processing capacity of each processing engine. Based on parsing historical processing data, the computing platform may categorize application messages and may determine, based on the categorizations, a priority level associated with each application message. The maximum processing capacities and the priority levels may be used to generate the application message prioritization framework that may be used to process subsequently received application messages.

Based on receiving an application message from an enterprise organization computing device, the computing platform may process the application message using the application message prioritization framework. To do so, the computing platform may determine whether at least one processing engine, of the plurality of processing engines, has processing capacity to process the application message. If the plurality of processing engines is unable to process the application message, then the computing platform may store the application message in a backlog to be processed at a later time. If at least one processing engine is able to process the application message, then the computing platform may determine whether the application message is associated with a first priority level such that the application message may be pushed to a processing engine (e.g., as opposed to an application message associated with a second priority level, which may indicate that the application message should be stored in the backlog). If the application message is associated with the first priority level, then the computing platform may transmit the application message to the processing engine to be processed. Alternatively, if the application message is associated with the second priority level, then the computing platform may store the application message in the backlog.

Computer Architecture

FIG. 1A depicts an illustrative example of a computer system 100 that may be used for prioritizing, in real-time or near real-time, messages for server processing based on monitoring and predicting server resource utilization, in accordance with one or more aspects described herein. Computer system 100 may comprise one or more computing devices including at least computing platform 110 and/or enterprise organization computing devices 120a-120g.

While FIG. 1A depicts more than one enterprise organization computing device (e.g., enterprise organization computing devices 120a-120g), each of enterprise organization computing devices 120a-120g may be configured in accordance with the features described herein. While the description herein may refer to enterprise organization computing device 120, the functions described in connection with enterprise organization computing device 120 may also be performed by any one of enterprise organization computing devices 120a-120g. While FIG. 1A depicts enterprise organization computing devices 120a-120g, more or fewer enterprise organization computing devices may exist within computer system 100. Enterprise organization computing device 120a-120g are depicted in FIG. 1A for illustration purposes only and are not meant to be limiting.

Each one of enterprise organization computing devices 120a-120g may be configured to communicate with computing platform 110 through network 130. Network 130 may include one or more sub-networks (e.g., local area networks (LANs), wide area networks (WANs), or the like). In some arrangements, computer system 100 may include additional computing devices and networks that are not depicted in FIG. 1A, which may also be configured to interact with computing platform 110.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with enterprise organization computing device 120 and/or additional computing devices.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in a database (e.g., database 119), for data received from at least one of enterprise organization computing device 120.

Enterprise organization computing device 120 may communicate with a plurality of enterprise organization applications, wherein each enterprise organization application may correspond to (e.g., offer, or the like) at least one enterprise organization service and/or program. Enterprise organization computing device 120 may generate, using at least one enterprise organization application, an application message and may transmit the application message to computing platform 110 for processing.

Figure 1B:
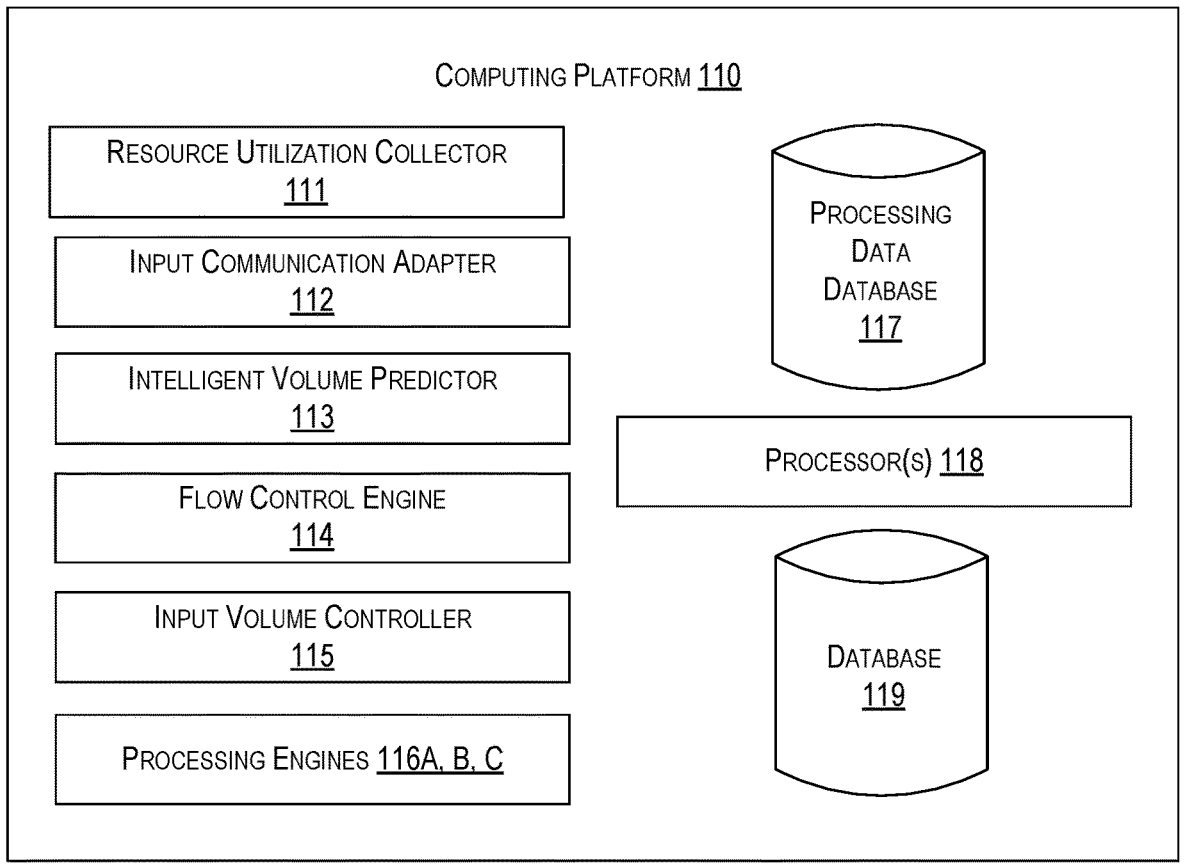
FIG. 1B depicts an illustrative example of a computing platform that may be used for prioritizing messages for server processing based on monitoring and predicting server resource utilization, in accordance with one or more example embodiments.

FIG. 1B depicts example components of computing platform 110 that may be used for prioritizing, in real-time or near real-time, messages for server processing based on monitoring and predicting server resource utilization, in accordance with one or more aspects described herein. Computing platform 110 may comprise resource utilization collector 111, input communication adapter 112, intelligent volume predictor 113, flow control engine 114, input volume controller 115, processing engines 116a-116c, processing data database 117, processor(s) 118, and/or database 119. Each computing device within computing platform 110 may contain processor(s) 118 and/or database 119, which may be stored in the memory of the one or more computing devices of computing platform 110. Through execution of computer-readable instructions stored in memory, the computing devices of computing platform 110 may be configured to perform functions of the centralized entity and store the data generated during the performance of such functions in database 119.

Resource utilization collector 111 may continuously monitor a plurality of processing engines (e.g., processing engines 116a-116c) to generate data that describes a processing history and a current processing capacity associated with each processing engine. Resource utilization collector 111 may also generate data that describes processing details that correspond to a plurality of application messages processed by each processing engine of the plurality of processing engines. Resource utilization collector 111 may store the data within a database (e.g., processing data database 117).

Input communication adapter 112 may facilitate communication between an application message controller (e.g., input volume controller 115) and the plurality of processing engines (e.g., processing engines 116a-116c). Input communication adapter 112 may receive, from the application message controller, the application message to be processed and an indication of the processing engine that may process the application message. Input communication adapter 112 may transmit the application message to be processed to the indicated processing engine.

Intelligent volume predictor 113 may predict a quantity of application messages that may be received at a later time for processing and may categorize the application messages stored in the database (e.g., processing data database 117). Intelligent volume predictor 113 may determine a priority level that corresponds to each application message stored in the database, and may generate an application message prioritization framework based on the predictions, categorizations, and/or priority levels.

Flow control engine 114 may use the data in a database (e.g., processing data database 117) to determine a maximum processing capacity of each processing engine of the plurality of processing engines. Flow control engine 114 may continuously compare a current processing capacity of each processing engine to a maximum processing capacity of each processing engine. Based on determining the maximum processing capacity of a processing engine changed, flow control engine 114 may update the corresponding maximum processing capacity.

Input volume controller 115 may receive an application message from an enterprise organization computing device (e.g., enterprise organization computing device 120) and may use the application message prioritization framework to determine a priority level associated with the application message. Input volume controller 115 may determine whether a processing engine of the plurality of processing engines has processing capacity to process the application message. Based on determining the plurality of processing engines might not have processing capacity to process the application message, input volume controller 115 may store the application message within a backlog to be processed at a later time. However, based on determining a processing engine may have processing capacity to process the application message, input volume controller 115 may determine whether the application message is associated with a first priority level.

Based on determining the application message may be associated with the first priority level, input volume controller 115 may transmit the application message to a communication adapter (e.g., input communication adapter 112) along with instructions to transmit the application message to the processing engine with processing capacity. Alternatively, based on determining the application message might not be associated with the first priority level, input volume controller 115 may store the application message within the backlog.

Processing engines 116a-116c may correspond to a plurality of servers and/or clusters of servers associated with the enterprise organization. Processing engines 116a-116c may receive, from the communication adapter (e.g., input communication adapter 112), the application message to be processed and may process the application message. While FIG. 1B depicts more than one processing engine (e.g., processing engines 116a-116c), each of processing engines 116a-116c may be configured in accordance with the features described herein. While the description herein may refer to processing engine 116, the functions described in connection with processing engine 116 may also be performed by any one of processing engines 116a-116c. While FIG. 1B depicts processing engines 116a-116c, more or fewer processing engines may exist within computing platform 110. Processing engines 116a-116c are depicted in FIG. 1B for illustration purposes only and are not meant to be limiting.

Processing data database 117 may comprise historical processing data associated with each processing engine and/or current application messages to be processed. Processing data database 117 may comprise previously processed application messages, a categorization of each previously processed application message, a priority level that corresponds to each previously processed application message, the application message prioritization framework, at least one current application message to be processed, a categorization of each current application message to be processed, a priority level that corresponds to each current application message to be processed, or the like. Processing data database 117 may further store the current processing capacities of the plurality of processing engines and the maximum processing capacities of the plurality of processing engines. Additionally or alternatively, processing data database 117 may comprise an amount of time taken to process each application message, an amount of memory used to process each application message, a hardware configuration associated with processing each application message, a measure of central processing units (CPU) used to process each application message, an amount of data processed within each application message, a time of year that each application message is processed, a time of day that each application message is processed, or the like.

Access to processing data database 117 may depend on the computing device requesting access (e.g., a hierarchy of accessibility). Resource utilization collector 111, intelligent volume predictor 113, and flow control engine 114 may be associated with a first level of accessibility (e.g., a least restrictive level of accessibility). As such, resource utilization collector 111, intelligent volume predictor 113, and flow control engine 114 may be authorized to perform functions on the data within processing data database 117 (e.g., access data, add data, remove data, modify data, or the like). The remaining computing devices within computing platform 110 may be associated with a second level of accessibility (e.g., a more restrictive level of accessibility that the first level of accessibility). As such, the remaining computing devices may be configured to view the data, but might not be permitted to add, remove, and/or modify the data within processing data database 117.

Prioritizing Messages for Server Processing Based on Monitoring and Predicting Server Resource Utilization FIGS. 2A-2D depict an illustrative event sequence for prioritizing, in real-time or near real-time, messages for server processing based on monitoring and predicting server resource utilization, in accordance with one or more aspects described herein. While aspects described with respect to FIGS. 2A-2D include the evaluation of a single application message, a plurality of application messages may be received and evaluated (e.g., in parallel) without departing from the present disclosure. One or more processes performed in FIGS. 2A-2D may be performed in real-time or near real-time and one or more steps or processes may be added, omitted, or performed in a different order without departing from the present disclosure.

Figure 2A:
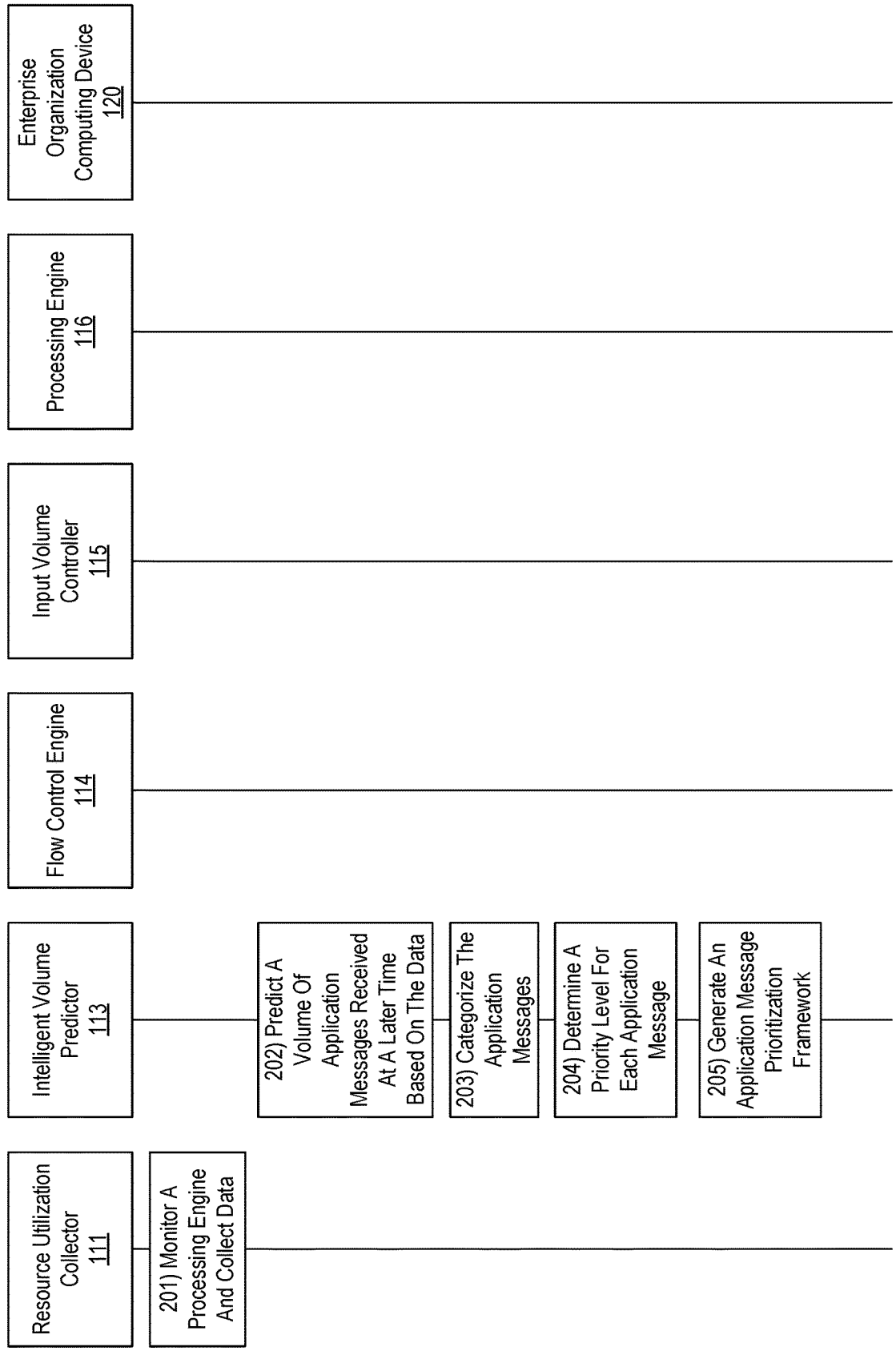

Referring to FIG. 2A, at step 201, resource utilization collector 111 may monitor processing engine 116 to generate data associated with processing engine 116. In particular, resource utilization collector 111 may monitor a quantity of application messages that may be received and/or processed by processing engine 116 (e.g., over a pre-determined period of time, or the like), wherein the data may comprise parsed application messages. An application message may correspond to communication conducted by a computing device (e.g., enterprise organization computing device, or the like) and between one or more enterprise organization applications therein (e.g., an enterprise organization communication application, an enterprise organization financial services application, an enterprise organization data storage application, or the like). Each enterprise organization application may correspond to (e.g., offer, or the like) at least one enterprise organization service and/or program (e.g., a loan repayment program that corresponds to the enterprise organization financial services application, an internal enterprise organization email service that corresponds to the enterprise organization communication application, or the like). The application message may be prioritized and/or processed in accordance with the method described herein.

Resource utilization collector 111 may generate, based on the monitoring, data that describes processing details associated with each application message processed by processing engine 116 (e.g., an amount of time taken to process an application message, an amount of memory used to process the application message, a hardware configuration associated with processing the application message, a measure of central processing units (CPU) used to process the application message, an amount of data processed within the application message, a time of year that the application message is processed, a time of day that the application message is processed, or the like). In some instances, resource utilization collector 111 may monitor processing engine 116 for a pre-determined amount of time (e.g., 8 hours, 24 hours, one week, one month, or the like) and/or until an occurrence of a triggering event (e.g., until processing engine 116 reaches a maximum processing capacity, until processing engine 116 experiences depleted processing resources, or the like). Resource utilization collector 111 may store the data within processing data database 117.

At step 202, intelligent volume predictor 113 may predict a volume (e.g., a quantity) of application messages that may be received at a later time. To do so, intelligent volume predictor 113 may retrieve the data from processing data database 117 (e.g., historical processing data gathered and/or generated by resource utilization collector 111, or the like). Intelligent volume predictor 113 may parse the retrieved data to identify a quantity of previously received and/or processed application messages that may have been received and/or processed during a pre-determined time frame (e.g., during a specific time of the year, during a specific day of the week, during a specific time of day, or the like). In instances where the retrieved data may span one or more iterations of the same pre-determined time frames, intelligent volume predictor 113 may compare the data associated with each iteration of the pre-determined time frame. For example, where the pre-determined time frame corresponds to a day of the week and where the retrieved data describes application message data over one or more weeks, intelligent volume predictor 113 may compare the application message data associated with each week. Based on the comparison, intelligent volume predictor 113 may determine a quantity of application messages that may be received during at least one future iteration of the pre-determined time frame (e.g., a quantity of application messages that may be received on the day of the week indicated in the pre-determined time frame over a pre-determined number of weeks in the future, or the like).

In some instances, the quantity of application messages that were received and/or processed during a first pre-determined time frame might not correspond to the quantity of application messages that were received and/or processed during a later iteration of the pre-determined time frame, wherein the first and the later iteration of pre-determined time frames may be the same. As such, intelligent volume predictor 113 may predict a range of quantities of application messages that may be received and/or processed during the at least one future iteration of the pre-determined time frame. Intelligent volume predictor 113 may store the predictions within processing data database 117.

At step 203, intelligent volume predictor 113 may categorize each previously received and/or processed application message. To do so, intelligent volume predictor 113 may identify, based on the parsing, the enterprise organization application associated with the application message and the enterprise organization service and/or program associated with the enterprise organization application. Intelligent volume predictor 113 may group application messages that correspond to a particular enterprise organization application. Additionally or alternatively, intelligent volume predictor 113 may group application messages that correspond to a particular enterprise organization service and/or program. Intelligent volume predictor 113 may categorize the application based on the grouping.

At step 204, intelligent volume predictor 113 may determine a priority level for each previously received and/or processed application message. The priority level may indicate when the application message may be transmitted to processing engine 116 for processing (e.g., to preserve the processing capacity of processing engine 116, to decrease the likelihood of processing engine 116 experiencing depleted processing resources, or the like). The processing of the application message may vary depending on at least an urgency associated with the application message. The urgency of the application message may be indicated within enterprise organization criteria, which may be generated by the enterprise organization and may identify a processing order for application messages associated with the enterprise organization services and/or programs. In particular, the processing order within the enterprise organization criteria may identify a hierarchy of enterprise organization services and/or programs and an order in which corresponding application messages should be processed (e.g., application messages that correspond to the enterprise organization financial services should be processed before the application messages that correspond to the enterprise organization email services, or the like).

The priority levels indicated with the enterprise organization criteria may comprise a first priority level and a second priority level. The first priority level may indicate that the corresponding application message might not be stored within a backlog for processing at a later time and that the corresponding application message may be pushed to processing engine 116 for processing without further analysis (e.g., based on determining processing engine 116 may be associated with sufficient processing and/or server resources to process the application message, or the like). However, the second priority level may indicate that the corresponding application message might not be pushed to processing engine 116 and that the corresponding application message may be stored within the backlog to be processed at a later time (e.g., based on determining processing engine 116 might not be associated with sufficient processing and/or server resources to process the application message, or the like).

To determine the priority level of each previously received and/or processed application message, intelligent volume predictor 113 may parse the enterprise organization criteria to identify a priority level that corresponds to the enterprise organization application and/or the enterprise organization service and/or program that corresponds to the application message (e.g., based on the categorization of the application message, or the like). In some instances, intelligent volume predictor 113 may determine that the enterprise organization criteria might not comprise the categorization of the application message. As such, intelligent volume predictor 113 may transmit a notification to the enterprise organization requesting manual intervention. Additionally or alternatively, intelligent volume predictor 113 may receive, from the enterprise organization, an indication of the priority level that corresponds to at least one of the enterprise organization application and/or the enterprise organization service and/or program.

At step 205, intelligent volume predictor 113 may generate an application message prioritization framework, which may be used to determine an order in which current application messages (and/or application messages received at a later time) may be processed. The application message prioritization framework may comprise each identified categorization of previously received and/or processed application messages and a priority level that corresponds to each categorization. As discussed below, the application message prioritization framework may further indicate a current processing capacity of processing engine 116 and/or a maximum processing capacity of processing engine 116. In some instances, the application message prioritization framework may comprise instructions for determining the order in which current application messages may be processed (e.g., categorize the current application message, compare the categorization to the enterprise organization criteria to determine a priority level associated with the categorization, or the like). Intelligent volume predictor 113 may store the application message prioritization framework within processing data database 117.

Referring to FIG. 2B and at step 206, flow control engine 114 may retrieve the data within processing data database 117 to determine a maximum processing capacity of processing engine 116. In particular, flow control engine 114 may retrieve data generated by resource utilization collector 111 (e.g., data that indicates a quantity of application messages processed by processing engine 116, data that describes the processing details associated with each application message, or the like). The maximum processing capacity may indicate a quantity of application messages (e.g., and/or a range of quantities of application messages, or the like) that processing engine 116 may process without experiencing depleted processing resources (e.g., without experiencing failure (e.g., server failure) of processing engine 116, without having to re-route the application message to a different processing engine, or the like).

Flow control engine 114 may parse the retrieved data to identify patterns that correspond to instances where the processing efficiency of processing engine 116 may continuously decrease (e.g., a number of application messages that processing engine 116 may process before experiencing reduced processing resources, a number of application messages that processing engine 116 may process before an expected processing time associated with each application message increases, or the like). Based on the identified patterns, flow control engine 114 may track a processing history associated with processing engine 116 and may determine, from the processing history, the maximum processing capacity of processing engine 116. Flow control engine 114 may store the identified patterns and the maximum processing capacity of processing engine 116 within processing data database 117. In some instances, flow control engine 114 may add the maximum processing capacity of processing engine 116 to the application message prioritization framework.

At step 207, flow control engine 114 may continuously monitor the data within processing data database 117 to determine whether the maximum processing capacity of processing engine 116 may have changed (e.g., increased, decreased, or the like). Flow control engine 114 may continuously retrieve the data from processing data database 117 (e.g., data generated by resource utilization collector 111, or the like). Flow control engine 114 may parse the retrieved data and identify updated patterns based on the parsing. Flow control engine 114 may store the identified updated patterns within processing data database 117. Flow control engine 114 may use the identified updated patterns to determine an updated maximum processing capacity of processing engine 116 and may compare the updated maximum processing capacity of processing engine 116 to previously determined maximum processing capacities of processing engine 116. In some instances, and based on the comparing, flow control engine 114 may determine that the current maximum processing capacity of processing engine 116 may correspond to (e.g., be the same as, or the like) the previously determined maximum processing capacities of processing engine 116.

If, at step 207, flow control engine 114 determines that the maximum processing capacity of processing engine 116 did not change, then, at step 208a, flow control engine 114 may continuously monitor the retrieved data within processing data database 117 (e.g., for a pre-determined amount of time, or the like). In some instances, flow control engine 114 may note (e.g., within processing data database 117, or the like) that the maximum processing capacity of processing engine 116 did not change (e.g., for each iteration of the process above wherein flow control engine 114 determines that the current maximum processing capacity of processing engine 116 is the same as the previously determined maximum processing capacities of processing engine 116, or the like).

Alternatively, if, at step 207, flow control engine 114 determines that the maximum processing capacity of processing engine 116 changed, then, at step 208b, flow control engine 114 may update the maximum processing capacity of processing engine 116 within processing data database 117 (e.g., and/or within the application message prioritization framework, or the like). To do so, flow control engine 114 may add the updated maximum processing capacity of processing engine 116 to processing data database 117 and may indicate that the updated maximum processing capacity of processing engine 116 may be the current maximum processing capacity. Flow control engine 114 may further indicate that the previously determined maximum processing capacities of processing engine 116 might not be the current maximum processing capacity and/or should not be used for determining whether processing engine 116 has processing capacity to process the application message.

At step 209, enterprise organization computing device 120 may generate an application message to be processed and may transmit the application message to input volume controller 115. Enterprise organization computing device 120 may utilize a plurality of enterprise organization applications to facilitate communication and/or to initiate a transaction with the enterprise organization and/or at least one other enterprise organization application. In particular, enterprise organization computing device 120 utilize at least one enterprise organization service and/or program offered by at least one enterprise organization application. The application message may comprise data that may be communicated between enterprise organization computing device 120 and the at least one enterprise organization application.

At step 210, input volume controller 115 may receive the application message from enterprise organization computing device 120 and may determine a priority level associated with the application message. To do so, input volume controller 115 may parse the application to identify the corresponding enterprise organization application. In some instances, input volume controller 115 may further parse the application message to identify the at least one enterprise organization service and/or program associated with the enterprise organization application that may correspond to the application message. Input volume controller 115 may categorize the application message based on identifying at least one of the corresponding enterprise organization application and/or the enterprise organization service and/or program associated with the enterprise organization application.

Input volume controller 115 may retrieve the application message prioritization framework from processing data database 117 and may parse the application message prioritization framework to identify the priority level associated with the categorization of the application message (e.g., the priority level that corresponds to application messages associated with the same and/or similar enterprise organization application, the priority level that corresponds to application messages associated with the same and/or similar enterprise organization service and/or program, or the like). Based on determining the categorization of the application message corresponds to (e.g., is the same as, is similar to, is within a pre-determined range of, or the like) a categorization within the application message prioritization framework, input volume controller 115 may determine the priority level of the application message based on the corresponding categorization within the application message prioritization framework.

However, in some instances, input volume controller 115 may determine that the categorization of the application message might not correspond to (e.g., is different from, is not similar to, is not within the pre-determined range of, or the like) the categorizations within the application message prioritization framework. As such, input volume controller 115 may transmit a notification to the enterprise organization for manual intervention (e.g., a manual determination of the priority level associated with the application message, or the like). Input volume controller 115 may receive, from the enterprise organization, the priority level associated with the application message. Additionally or alternatively, input volume controller 115 may receive, from the enterprise organization, the enterprise organization criteria that may comprise an updated list of enterprise organization applications, enterprise organization services and/or programs, and/or corresponding priority levels. Input volume controller 115 may store the priority level of the application message within processing data database 117.

Figure 2C:
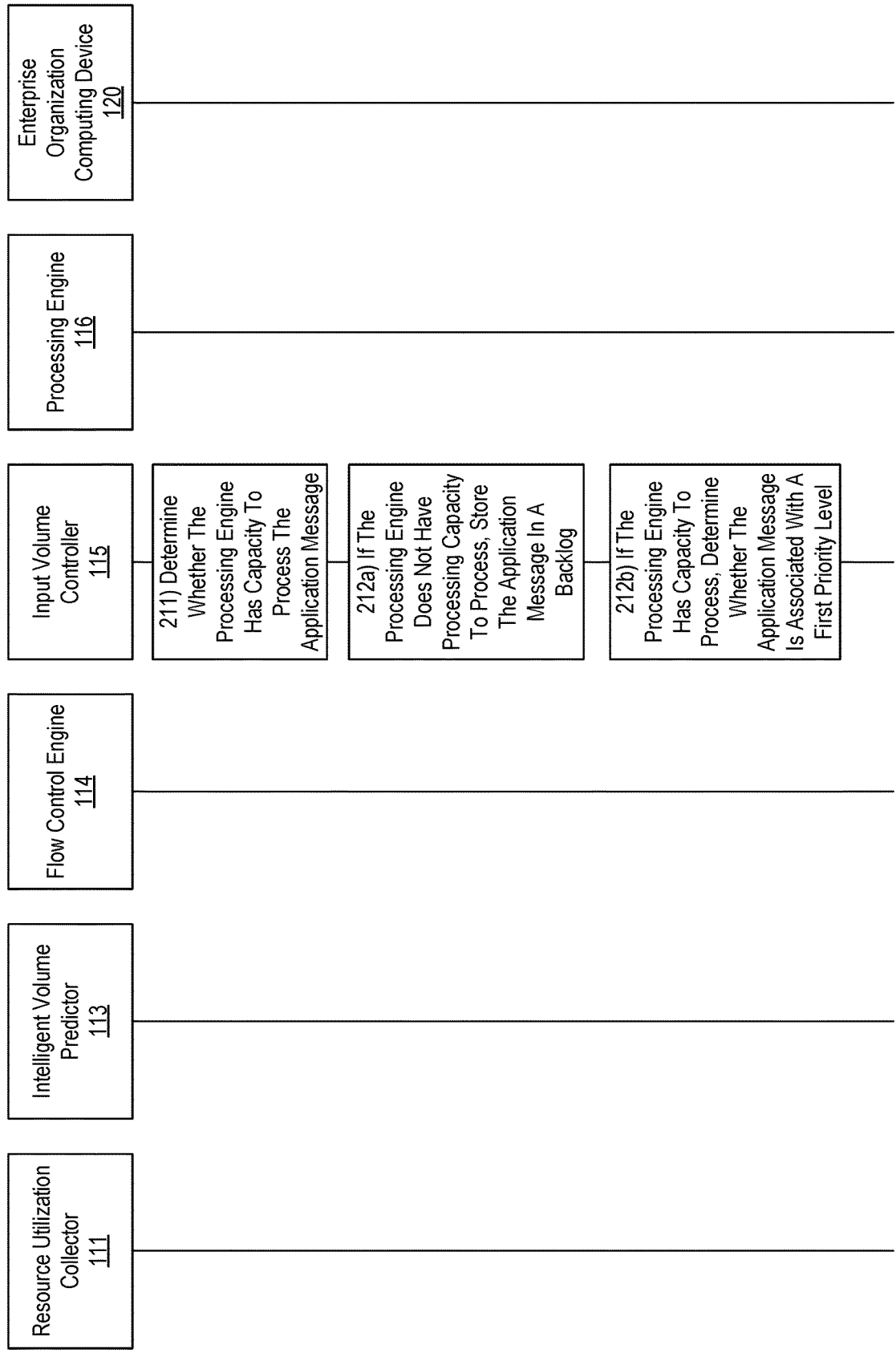

Referring to FIG. 2C and at step 211, input volume controller 115 may compare a current processing capacity of processing engine 116 to the maximum processing capacity of processing engine 116 to determine whether processing engine 116 may have processing capacity to process the application message. To determine the current processing capacity of processing engine 116, input volume controller 115 may analyze the data generated by resource utilization collector 111 within processing data database 117. The data within processing data database 117 may indicate a current quantity of application messages being processed by processing engine 116 as well as processing details associated with each application message being processed by processing engine 116, which may indicate the current processing capacity of processing engine 116 (e.g., an amount of memory used to process each application message, a measure of central processing units (CPU) used to process each application message, or the like). In some instances, input volume controller 115 may store the current processing capacity of processing engine 116 within processing data database 117.

Input volume controller 115 may determine that processing engine 116 might not have processing capacity to process the application message based on determining the current processing capacity of processing engine 116 may be equal to (e.g., or within a pre-determined range of, or the like) the maximum processing capacity of processing engine 116. Alternatively, input volume controller 115 may determine that processing engine 116 may have processing capacity to process the application message based on determining the current processing capacity of processing engine 116 may be less than (e.g., or less than the pre-determined range of, or the like) the maximum processing capacity of processing engine 116.

If, at step 211, input volume controller 115 determines that processing engine 116 might not have processing capacity to process the application message, then, at step 212a, input volume controller 115 may store the application message within the backlog to be processed at a later time. The backlog may utilize a pre-determined framework (e.g., a first-in-first-out processing method, or the like) to determine an order in which application messages may be transmitted from the backlog to processing engine 116 for further processing. In some instances, input volume controller 115 may continuously compare the current processing capacity of processing engine 116 to the maximum processing capacity of processing engine 116 to determine when processing engine 116 may have processing capacity to process the application messages stored within the backlog. Based on determining processing engine 116 may have processing capacity to process at least one application message stored within the backlog, input volume controller 115 may retrieve the at least one application message and may process the at least one retrieved application message in accordance with the steps described herein.

Alternatively, if, at step 211, input volume controller 115 determines that processing engine 116 may have processing capacity to process the application message, then, at step 212b, input volume controller 115 may determine whether the application message may be associated with the first priority level. In some instances and based on retrieving the at least one application message from the backlog, input volume controller 115 may determine whether the at least one application message may be associated with the first priority level.

Figure 2D:
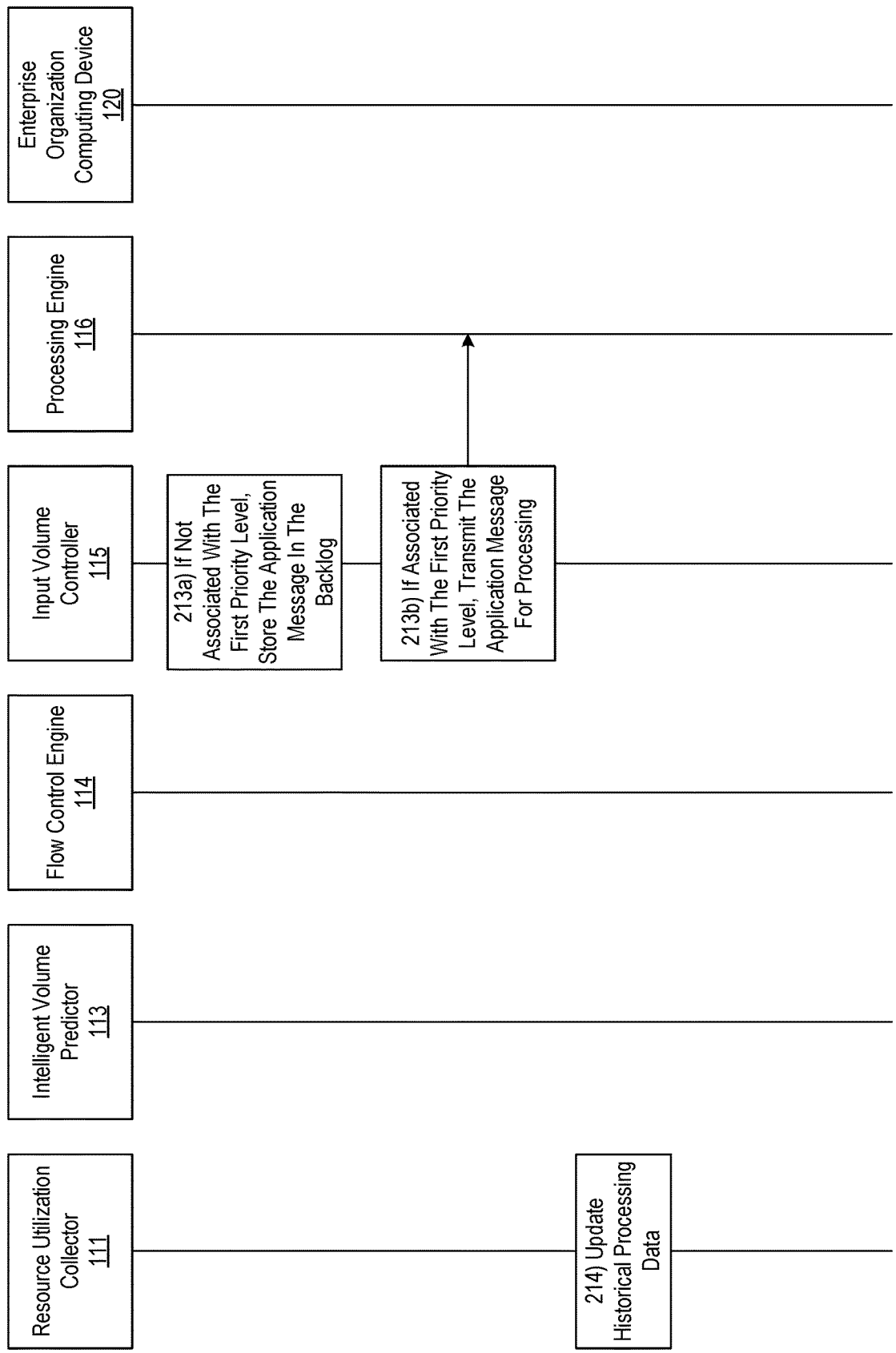

If, at step 212b, input volume controller 115 determines that the application message (or the at least one application message retrieved from the backlog) might not be associated with the first priority level (e.g., may be associated with the second priority level, or the like), then, referring to FIG. 2D and at step 213a, input volume controller 115 may store the application message (and/or the at least one application message retrieved from the backlog) within the backlog.

Alternatively, if, at step 212b, input volume controller 115 determines that the application message (or the at least one application message retrieved from the backlog) may be associated with the first priority level, then, at step 213b, input volume controller 115 may transmit the application message (or the at least one application message retrieved from the backlog) to processing engine 116 for further processing.

At step 214, resource utilization collector 111 may determine that the application message may be stored within the backlog or may be transmitted to processing engine 116 for processing, and may update the data within processing data database 117 accordingly.

Figure 3:
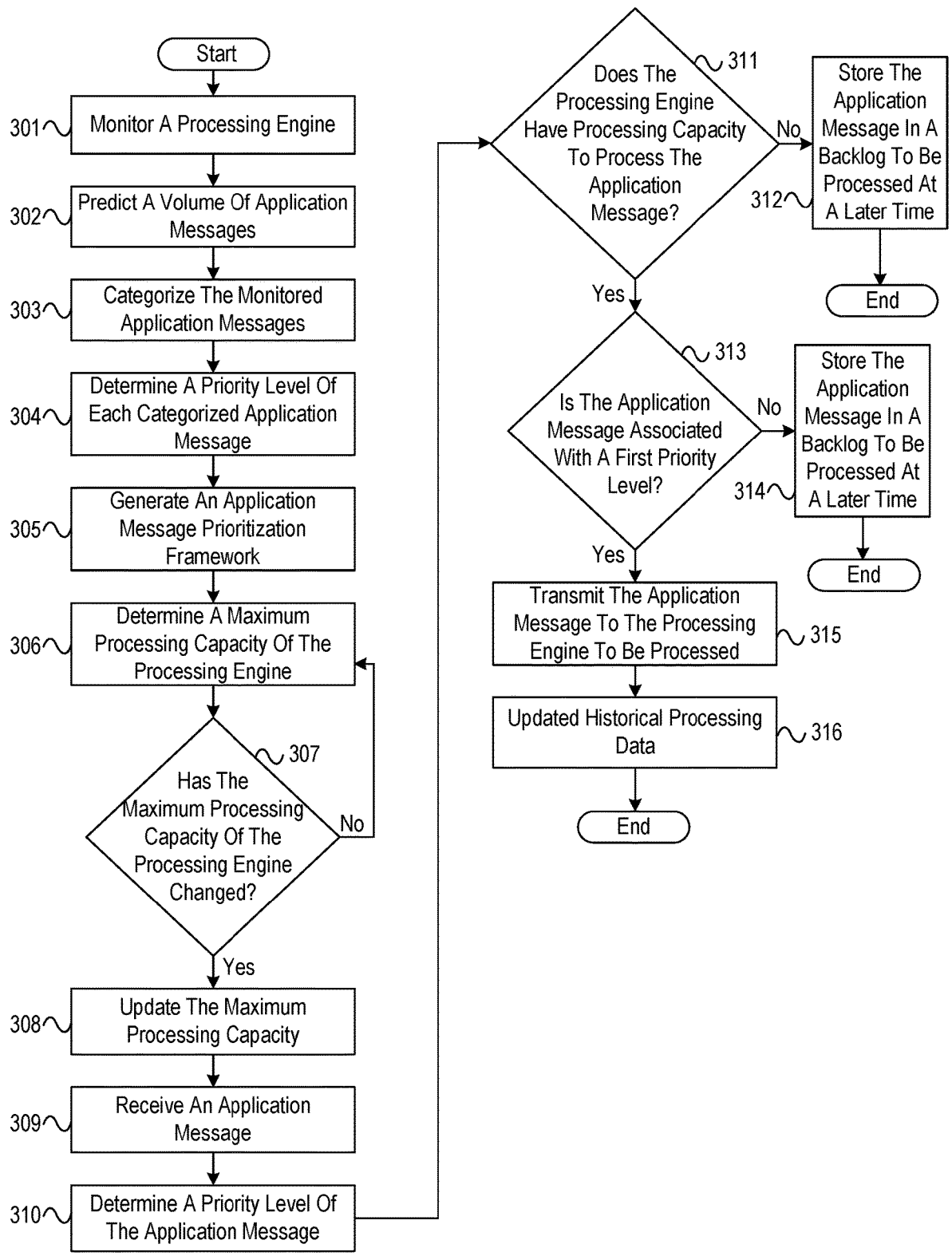
FIG. 3 depicts an illustrative method for prioritizing messages for server processing based on monitoring and predicting server resource utilization, in accordance with one or more example embodiments.

FIG. 3 depicts an illustrative event sequence for prioritizing, in real-time or near real-time, messages for server processing based on monitoring and predicting server resource utilization, in accordance with one or more aspects described herein. While aspects described with respect to FIG. 3 include the evaluation of a single application message, a plurality of application messages may be received and evaluated (e.g., in parallel) without departing from the present disclosure. One or more processes performed in FIG. 3 may be performed in real-time or near real-time and one or more steps or processes may be added, omitted, or performed in a different order without departing from the present disclosure At step 301, computing platform 110 (e.g., via resource utilization collector 111) may monitor a quantity of application messages that may be received and/or processed by processing engine 116 and may generate, based on the monitoring, data that describes processing details associated with each application message processed by processing engine 116.

At step 302, computing platform 110 (e.g., via intelligent volume predictor 113) may predict a volume (e.g., a quantity) of application messages that may be received at a later time. Intelligent volume predictor 113 may retrieve the data from processing data database 117 and may parse the retrieved data to identify a quantity of previously received and/or processed application messages that may have been received and/or processed during a pre-determined time frame. Intelligent volume predictor 113 may analyze the identified quantities to determine a quantity of application messages that may be received during at least one future iteration of the pre-determined time frame.

At step 303, computing platform 110 (e.g., via intelligent volume predictor 113) may categorize each previously received and/or processed application message based on the parsing. Intelligent volume predictor 113 may identify the enterprise organization application associated with the application message and/or the enterprise organization service and/or program associated with the enterprise organization application, and may group application messages that correspond to a particular enterprise organization application and/or enterprise organization service and/or program. Intelligent volume predictor 113 may categorize the application based on the grouping.

At step 304, computing platform 110 (e.g., via intelligent volume predictor 113) may determine a priority level for each previously received and/or processed application message based on parsing the enterprise organization criteria that may indicate (e.g., based on the categorization of the application message, or the like) a priority level that corresponds to each enterprise organization application and/or each enterprise organization service and/or program that may correspond to the application message.

At step 305, computing platform 110 (e.g., via intelligent volume predictor 113) may generate the application message prioritization framework, which may comprise each identified categorization of previously received, processed application messages and a priority level that corresponds to each categorization, a current processing capacity of processing engine 116, and/or a maximum processing capacity of processing engine 116.

At step 306, computing platform 110 (e.g., via flow control engine 114) may determine a maximum processing capacity of processing engine 116 based on analyzing the data within processing data database 117. Flow control engine 114 may parse the retrieved data to identify patterns that correspond to instances where the processing efficiency of processing engine 116 may continuously decrease. Based on the identified patterns, flow control engine 114 may track a processing history associated with processing engine 116 and may determine, from the processing history, the maximum processing capacity of processing engine 116.

At step 307, computing platform 110 (e.g., via flow control engine 114) may determine whether the maximum processing capacity of processing engine 116 may have changed. To do so, flow control engine 114 may continuously monitor the data within processing data database 117 to identify updated patterns. Flow control engine 114 may use the identified updated patterns to determine an updated maximum processing capacity of processing engine 116 and may compare the updated maximum processing capacity of processing engine 116 to previously determined maximum processing capacities of processing engine 116.

If, at step 307, computing platform 110 (e.g., via flow control engine 114) determines that the maximum processing capacity of processing engine 116 did not change, then the method described herein may return to step 306 in that flow control engine 114 may continuously monitor the retrieved data within processing data database 117 (e.g., for a pre-determined amount of time, or the like).

However, if, at step 307, computing platform 110 (e.g., via flow control engine 114) determines that the maximum processing capacity of processing engine 116 changed, then, at step 308, flow control engine 114 may update the maximum processing capacity of processing engine 116 within processing data database 117.

At step 309, computing platform 110 (e.g., via input volume controller 115) may receive an application message from enterprise organization computing device 120.

At step 310, computing platform 110 (e.g., via input volume controller 115) may determine a priority level associated with the application message. Input volume controller 115 may parse the application to identify the corresponding enterprise organization application and/or enterprise organization service and/or program, and may categorize the application message based on identifying at least one of the corresponding enterprise organization application and/or the enterprise organization service and/or program associated with the enterprise organization application. Input volume controller 115 may retrieve the application message prioritization framework from processing data database 117 and may parse the application message prioritization framework to identify the priority level associated with the categorization of the application message.

At step 311, computing platform 110 (e.g., via input volume controller 115) may determine whether processing engine 116 may have processing capacity to process the application message based on comparing a current processing capacity of processing engine 116 to the maximum processing capacity of processing engine 116. To do so, input volume controller 115 may retrieve, from processing data database 117, the data generated by resource utilization collector 111.

If, at step 311, computing platform 110 (e.g., via input volume controller 115) determines that processing engine 116 might not have processing capacity to process the application message, then, at step 312, input volume controller 115 may store the application message within the backlog to be processed at a later time.

Alternatively, if, at step 211, computing platform 110 (e.g., via input volume controller 115) determines that processing engine 116 may have processing capacity to process the application message, then, at step 313, input volume controller 115 may determine whether the application message may be associated with the first priority level.

If, at step 313, computing platform 110 (e.g., via input volume controller 115) determines that the application message might not be associated with the first priority level (e.g., may be associated with the second priority level, or the like), then, at step 314, input volume controller 115 may store the application message within the backlog (e.g., to prioritize processing capacity for application messages associated with the first priority level, or the like).

However, if, at step 313, computing platform 110 (e.g., via input volume controller 115) determines that the application message may be associated with the first priority level, then, at step 315, input volume controller 115 may transmit the application message to processing engine 116 for further processing.

At step 316, computing platform 110 (e.g., via resource utilization collector 111) may determine that the application message may be stored within the backlog or may be transmitted to processing engine 116 for processing, and may update the data within processing data database 117.

As a result, the proposed solution may provide the following benefits: 1) real-time, or near real-time, monitoring of application messages generated by enterprise organization computing devices; 2) real-time, or near real-time, monitoring of processing engines to determine current processing capacities of the processing engines and maximum processing capacities of the processing engines; 3) real-time, or near real-time, predictions indicating a volume of application messages that may be received at a later time; 4) real-time, or near real-time, prioritization of the application messages to be processed; and 5) real-time, or near real-time, processing of the application messages based on the predictions, prioritization, and/or processing capacities of each processing engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
monitoring, by a computing platform having at least one processor, memory and a communication interface, a plurality of processing engines;
generating, by the at least one processor and based on the monitoring, data that indicates a quantity of application messages of a plurality of application messages processed by each processing engine of a plurality of processing engines;
generating, by the at least one processor and based on the monitoring, data that describes processing details associated with each application message of the plurality of application messages processed by each processing engine of the plurality of processing engines;
predicting, by the at least one processor and using the data that describes the processing details associated with each application message of the plurality of application messages processed by each processing engine of the plurality of processing engines, a maximum processing capacity for each processing engine of the plurality of processing engines;
determining, by the at least one processor and using the data that describes the processing details associated with each application message of the plurality of application messages processed by each processing engine of the plurality of processing engines, a priority level that describes each application message of the plurality of application messages processed by each processing engine of the plurality of processing engines;

generating, by the at least one processor, an application message prioritization framework based on the maximum processing capacities and the priority levels;

receiving, by the at least one processor and from an enterprise organization application, an application message to be processed;

determining, by the at least one processor and based on the application message prioritization framework, whether a processing engine of the plurality of processing engines has capacity to process the application message;

based on determining the processing engine has capacity to process the application message, determining, by the at least one processor and based on the application message prioritization framework, whether the application message is associated with a first priority level; and based on determining the application message is associated with the first priority level, transmitting, by the at least one processor, the application message to the processing engine to be processed.

2. The method of claim 1, wherein the data that describes the processing details associated with each application message of the plurality of application messages processed by each processing engine of the plurality of processing engines comprises at least one of:

an amount of time taken to process an application message;

an amount of memory used to process the application message;

a hardware configuration associated with processing the application message;

a measure of central processing units (CPU) used to process the application message;

an amount of data processed within the application message;

a time of year that the application message is processed; or a time of day that the application message is processed.

3. The method of claim 1, wherein the predicting the maximum processing capacity of each processing engine of the plurality of processing engines further comprises:

analyzing, for each processing engine of the plurality of processing engines, the data that describes the processing details associated with each application message of the plurality of application messages processed by each processing engine of the plurality of processing engines; and determining, based on the analyzing:
a total number of application messages processed by each processing engine of the plurality of processing engines; and
a total measure of central processing units (CPU) used to process the application messages.

4. The method of claim 1, wherein the determining the priority level that describes each application message of the plurality of application messages processed by each processing engine of the plurality of processing engines further comprises:

categorizing each application message based on an enterprise organization service associated with the application message; and comparing the categorizations of each application message to enterprise organization criteria, wherein the enterprise organization criteria comprises a processing order that corresponds to a plurality of enterprise organization services.

5. The method of claim 4, wherein a priority level that describes the application message corresponds to the first priority level, and wherein the first priority level indicates the application message is processed without further analysis.

6. The method of claim 4, wherein a priority level that describes the application message corresponds to a second priority level, and wherein the second priority level indicates that the application message is added to a processing backlog to be processed at a later time.

7. The method of claim 6, further comprising, based on the priority level of the application message corresponding to the second priority level, storing the application message within the processing backlog.

8. The method of claim 1, further comprising determining, based on receiving the application message to be processed, a current processing capacity of each processing engine of the plurality of processing engines.

9. The method of claim 8, wherein the determining whether the processing engine of the plurality of processing engines has capacity to process the application message comprises comparing the current processing capacity of the processing engine to a maximum processing capacity of the processing engine.

10. The method of claim 9, wherein the determining whether the processing engine of the plurality of processing engines has capacity to process the application message is further based on determining the current processing capacity of the processing engine is less than the maximum processing capacity of the processing engine.

11. The method of claim 9, wherein the determining whether the processing engine of the plurality of processing engines has capacity to process the application message further includes determining the processing engine does not have capacity to process the application message based on determining the current processing capacity of the processing engine is greater than the maximum processing capacity of the processing engine.

12. A computing platform comprising:
at least one processor;
a communication interface communicatively coupled to the at least one processor; and
memory storing computer-readable instructions that, when executed by the at least one processor, cause the computing platform to:
monitor, by a computing platform, a plurality of processing engines;
generate, based on the monitoring, data that indicates a quantity of application messages of a plurality of application messages processed by each processing engine of a plurality of processing engines;
generate, based on the monitoring, data that describes processing details associated with each application message of the plurality of application messages processed by each processing engine of the plurality of processing engines;
predict, using the data that describes processing details associated with each application message of the plurality of application messages processed by each processing engine of the plurality of processing engines, a maximum processing capacity for each processing engine of the plurality of processing engines;

determine, using the data that describes processing details associated with each application message of the plurality of application messages processed by each processing engine of the plurality of processing engines, a priority level that describes each application message of the plurality of application messages processed by each processing engine of the plurality of processing engines;

generate an application message prioritization framework based on the maximum processing capacities and the priority levels;

receive, from an enterprise organization application, an application message to be processed;

determine, based on the application message prioritization framework, whether a processing engine of the plurality of processing engines has capacity to process the application message;

based on determining the processing engine has capacity to process the application message, determine, based on the application message prioritization framework, whether the application message is associated with a first priority level; and based on determining the application message is associated with the first priority level, transmit the application message to the processing engine to be processed.

13. The computing platform of claim 12, wherein the determining the priority level that describes each application message of the plurality of application messages processed by each processing engine of the plurality of processing engines further causes the computing platform to:

categorize each application message based on an enterprise organization service associated with the application message; and compare the categorizations of each application message to enterprise organization criteria, wherein the enterprise organization criteria comprises a processing order that corresponds to a plurality of enterprise organization services.

14. The computing platform of claim 13, wherein a priority level that describes the application message corresponds to the first priority level, and wherein the first priority level indicates the application message is processed without further analysis.

15. The computing platform of claim 13, wherein a priority level that describes the application message corresponds to a second priority level, and wherein the second priority level indicates that the application message is added to a processing backlog to be processed at a later time.

16. The computing platform of claim 15, wherein the instructions, when executed, further cause the computing platform to, based on the priority level of the application message corresponding to the second priority level, store the application message within the processing backlog.

17. One or more non-transitory computer-readable media storing instructions that, when executed by a computing platform comprising at least one processor, memory, and a communication interface, cause the computing platform to:

monitor, by a computing platform, a plurality of processing engines;

generate, based on the monitoring, data that indicates a quantity of application messages of a plurality of application messages processed by each processing engine of a plurality of processing engines;

generate, based on the monitoring, data that describes processing details associated with each application message of the plurality of application messages processed by each processing engine of the plurality of processing engines;

predict, using the data that describes the processing details associated with each application message of the plurality of application messages processed by each processing engine of the plurality of processing engines, a maximum processing capacity for each processing engine of the plurality of processing engines;

determine, using the data that describes processing details associated with each application message of the plurality of application messages processed by each processing engine of the plurality of processing engines, a priority level that describes each application message of the plurality of application messages of the plurality of application messages processed by each processing engine of the plurality of processing engines;

generate an application message prioritization framework based on the maximum processing capacities and the priority levels;

receive, from an enterprise organization application, an application message to be processed;

determine, based on the application message prioritization framework, whether a processing engine of the plurality of processing engines has capacity to process the application message;

based on determining the processing engine has capacity to process the application message, determine, based on the application message prioritization framework, whether the application message is associated with a first priority level; and based on determining the application message is associated with the first priority level, transmit the application message to the processing engine to be processed.

18. The non-transitory computer-readable media of claim 17, wherein the instructions, when executed, further cause the computing platform to determine, based on receiving the application message to be processed, a current processing capacity of each processing engine of the plurality of processing engines.

19. The non-transitory computer-readable media of claim 18, wherein the determining whether the processing engine of the plurality of processing engines has capacity to process the application message further causes the computing platform to compare the current processing capacity of the processing engine to a maximum processing capacity of the processing engine.

20. The non-transitory computer-readable media of claim 19, wherein the determining whether the processing engine of the plurality of processing engines has capacity to process the application message is further based on determining the current processing capacity of the processing engine is less than the maximum processing capacity of the processing engine.

* * * * *